US011454950B2

(12) United States Patent
Matsumoto

(10) Patent No.: US 11,454,950 B2
(45) Date of Patent: Sep. 27, 2022

(54) MACHINING CONTROL SYSTEM AND MACHINING SYSTEM

(71) Applicant: FANUC CORPORATION, Yamanashi (JP)

(72) Inventor: Hiroshi Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 102 days.

(21) Appl. No.: 16/851,256

(22) Filed: Apr. 17, 2020

(65) Prior Publication Data
US 2020/0356072 A1  Nov. 12, 2020

(30) Foreign Application Priority Data

May 8, 2019 (JP) .............................. JP2019-088060

(51) Int. Cl.
*G05B 19/408* (2006.01)
*G05B 19/4097* (2006.01)
*G05B 19/406* (2006.01)

(52) U.S. Cl.
CPC ....... *G05B 19/4097* (2013.01); *G05B 19/406* (2013.01); *G05B 19/408* (2013.01); *G05B 2219/31342* (2013.01)

(58) Field of Classification Search
None
See application file for complete search history.

(56) References Cited

U.S. PATENT DOCUMENTS

| 2002/0111708 | A1* | 8/2002 | Nakano | H01L 21/67276 700/121 |
| 2011/0161608 | A1* | 6/2011 | Bellows | G06F 12/0813 711/162 |
| 2013/0275710 | A1* | 10/2013 | Colgrove | G06F 3/0688 711/168 |
| 2014/0297956 | A1* | 10/2014 | Ishinaka | G06F 12/0862 711/119 |

(Continued)

FOREIGN PATENT DOCUMENTS

| EP | 553349 A1 * | 8/1993 | ......... G05B 19/4181 |
| JP | H05-053628 A | 3/1993 | |

(Continued)

OTHER PUBLICATIONS

An Office Action; "Notice of Reasons for Refusal," mailed by the Japanese Patent Office dated Jul. 5, 2022, which corresponds to Japanese Patent Application No. 2019-088060 and is related to U.S. Appl. No. 16/851,256; with English language translation.

*Primary Examiner* — Jennifer L Norton
(74) *Attorney, Agent, or Firm* — Studebaker & Brackett PC

(57) ABSTRACT

A machining control system according to an aspect of the present disclosure includes: a program storage unit which stores a machining program including a plurality of data blocks; a program cache unit which temporarily stores a part of the machining program; a schedule storage unit which stores schedule information specifying a transmission sequence to the program cache unit of the plurality of data blocks; a transmission control unit which controls transmission of the data blocks to the program cache unit from the program storage unit, based on the schedule information; and a machining processing unit which reads out the data blocks from the program cache unit and performs processing required in machining.

5 Claims, 3 Drawing Sheets

(56) References Cited

U.S. PATENT DOCUMENTS

| | | | |
|---|---|---|---|
| 2015/0185724 A1* | 7/2015 | Noguchi | G05B 19/042 |
| | | | 700/86 |
| 2015/0286574 A1* | 10/2015 | Endou | G06F 9/3814 |
| | | | 712/225 |
| 2017/0227940 A1* | 8/2017 | Katsu | H04M 11/00 |
| 2018/0095788 A1* | 4/2018 | Coleman | G06F 3/065 |
| 2021/0173775 A1* | 6/2021 | Mikami | G06F 12/0802 |
| 2022/0214665 A1* | 7/2022 | Holmstrom | G05B 19/4185 |

FOREIGN PATENT DOCUMENTS

| | | | | |
|---|---|---|---|---|
| JP | 2001-166811 A | 6/2001 | | |
| WO | WO-9736234 A1 * | 10/1997 | | G06F 9/3802 |

\* cited by examiner

FIG. 2

| PROGRAM NUMBER | TRANSMISSION START LINE NUMBER | TRANSMISSION LINE NUMBER |
|---|---|---|
| O1000 | 1 | 25 |
| O1000 | 400 | 80 |
| O1010 | 1 | 70 |
| O1000 | 581 | 150 |
| O1020 | 1 | 40 |
| O1021 | 1 | 100 |
| O1020 | 41 | 80 |
| O1000 | 731 | 100 |
| ... | ... | ... |
| END | | |

FIG. 3

| PROGRAM NUMBER | TRANSMISSION START LINE NUMBER | TRANSMISSION LINE NUMBER |
|---|---|---|
| O1000 | 1 | UNTIL THE END |
| END | | |

FIG. 4

| PROGRAM NUMBER | TRANSMISSION START LINE NUMBER | TRANSMISSION LINE NUMBER |
|---|---|---|
| O1000 | 1 | 25 |
| O1000 | 200 | 50 |
| O1010 | 1 | 70 |
| O1000 | 581 | 150 |
| O1020 | 1 | 40 |
| O1021 | 1 | 100 |
| O1020 | 41 | 80 |
| O1000 | 731 | 100 |
| ... | ... | ... |
| END | | |

MACHINING CONTROL SYSTEM AND MACHINING SYSTEM

This application is based on and claims the benefit of priority from Japanese Patent Application No. 2019-088060, filed on 8 May 2019, the content of which is incorporated herein by reference.

BACKGROUND OF THE INVENTION

Field of the Invention

The present invention relates to a machining control system and a machining system.

Related Art

A numerical control device of a machining device such as a machining center controls the positions of a tool and workpiece based on a machining program. The numerical control device is configured by a computer device having an arithmetic device and storage device. In a case of machining a variety of workpieces, and case of performing complex machining, since the data volume of the machining program required to do so becomes large, it may be difficult to store all of the machining program in an internal storage device of the numerical control device.

For this reason, technology has been known which stores the required machining program in an external device connected to the numerical control device such as a server or external storage device, for example, and sends a machining program or part of a machining program to the numerical control device as necessary (for example, refer to Patent Document 1).

Patent Document 1: Japanese Unexamined Patent Application, Publication No. H5-53628

SUMMARY OF THE INVENTION

The system disclosed in Patent Document 1 stores a plurality of programs in a host computer, and sends programs in sequence to the numerical control device from a host computer in accordance with schedule data. In addition, Patent Document 1 discloses dividing programs of large size into data block units, and sending sequentially.

In the machining program, there are those having a conditional branch, and not executed in the listed order. For this reason, in the case of sending a program in data block units in the system described in Patent Document 1, if a conditional branch is included in the machining program, there is a possibility of a data block to be executed after the conditional branch not being sent to the numerical control device. In this case, the numerical control device requests the required data block from the host computer, and it is necessary to interrupt machining and standby until this data block is sent.

In addition, there are also cases of establishing as a configuration which separately writes the machining program as a main program and sub programs, and calls the sub programs from the main program. Also in this case, upon calling a sub program, there is a possibility of the sub program not being read into the numerical control device. For this reason, technology has been demanded which can suppress a decline in productivity when executing a machining program calling a machining program in which a conditional branch is included or a sub program.

A machining control system according to an aspect of the present disclosure includes: a program storage unit which stores a machining program including a plurality of data blocks; a program cache unit which temporarily stores a part of the machining program; a schedule storage unit which stores schedule information specifying a transmission sequence to the program cache unit of the plurality of data blocks; a transmission control unit which controls transmission of the data blocks to the program cache unit from the program storage unit, based on the schedule information; and a machining processing unit which reads out the data blocks from the program cache unit and performs processing required in machining.

The machining control system according to the present disclosure can suppress a decline in productivity when executing a machining program in which a conditional branch or calling of a sub program is included.

BRIEF DESCRIPTION OF THE DRAWINGS

FIG. 2 is a schematic diagram showing an example of schedule information in the machining system of FIG. 1;

FIG. 3 is a schematic diagram showing an example of the initial setting of schedule information in the machining system of FIG. 1; and FIG. 4 is a schematic diagram showing an example of an actual execution sequence in the machining system of FIG. 1.

DETAILED DESCRIPTION OF THE INVENTION

Figure 1:
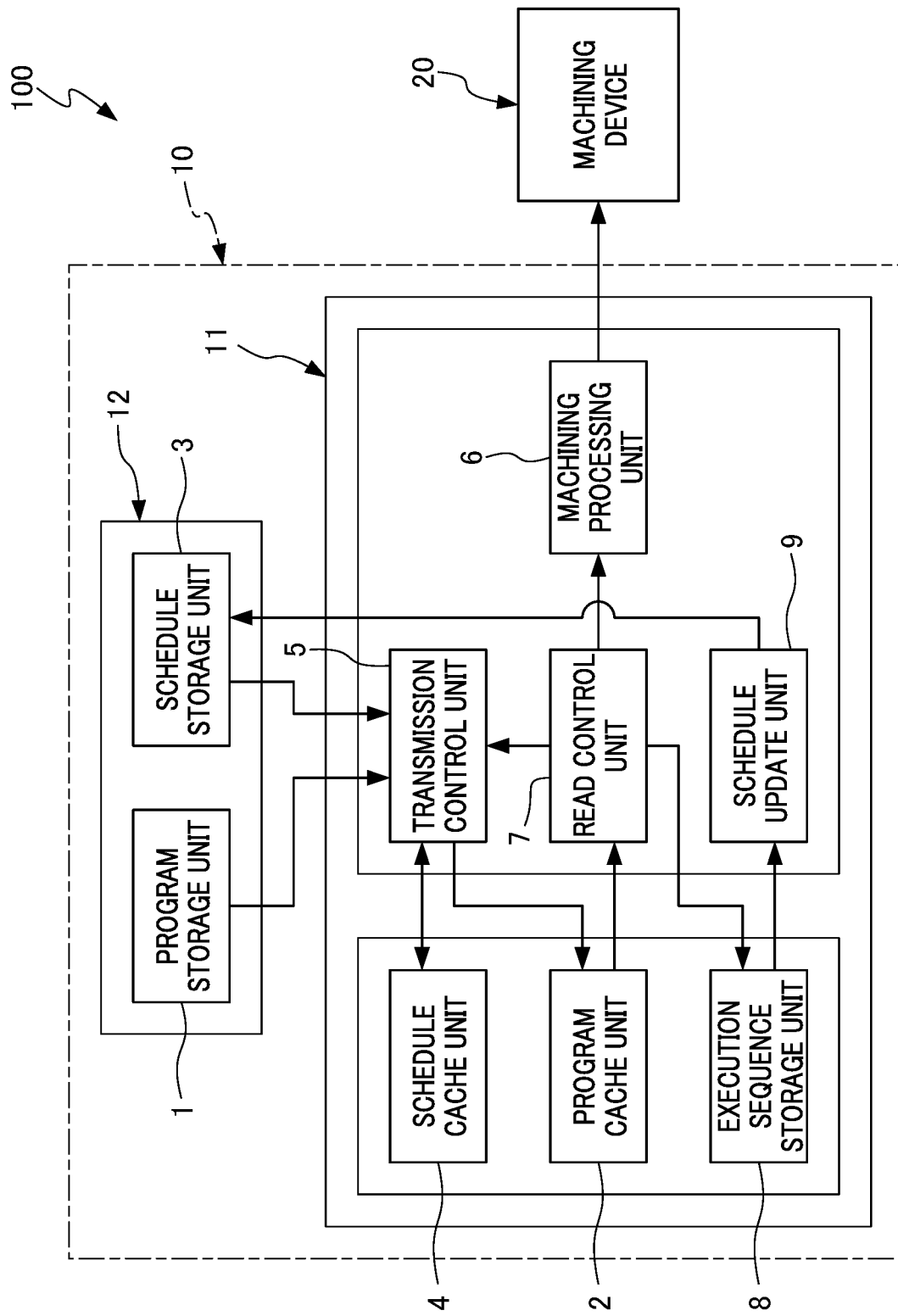
FIG. 1 is a schematic diagram showing the configuration of a machining system according to an embodiment of the present disclosure.

Hereinafter, an embodiment of the present disclosure will be explained while referencing the drawings. FIG. 1 is a block diagram showing the configuration of a machining system 100 according to an embodiment of the present disclosure.

The machining system 100 includes a machining control system 10, and a machining device 20 which is controlled by the machining control system 10. The machining control system 10 in itself is an embodiment of the machining control system according to the present disclosure.

The machining control system 10 includes: a program storage unit 1 which stores machining programs including a plurality of data blocks; a program cache unit 2 which temporarily stores parts of machining programs; a schedule storage unit 3 which stores schedule information specifying a transmitting sequence of a plurality of data blocks to the program cache unit; a schedule cache unit 4 which reads schedule information from the schedule storage unit 2 and temporarily stores; a transmission control unit 5 which controls transmission of data blocks from the program storage unit 1 to the program cache unit 2 based on the schedule information; a machining processing unit 6 which reads out data blocks from the program cache unit 2 and performs the processing necessary in machining; a read control unit 7 which arbitrates reading of data from the program cache unit 2 of the machining processing unit 6; an execution sequence storage unit 8 which stores the sequence of data blocks read by the machining processing unit 6; and a schedule update unit 9 which switches the schedule information of the schedule storage unit 3 so as to match the sequence stored by the execution sequence storage unit 8.

In the machining system 100 of the present embodiment, the program cache unit 2, schedule cache unit 4, transmission control unit 5, machining processing unit 6, read control unit 7, execution sequence storage unit 8, and schedule update unit 9 are provided to the numerical control device 11, and the program storage unit 1 and schedule storage unit 3 are provided to the external device 12 connected to the numerical control device 11 via a serial bus, a network, etc.

The numerical control device 11 can be configured by a computer device having internal memory, CPU, etc. In addition, the external device 12 can be configured by a server configured from a separate computer device, or an external storage device or the like which is removable relative to the numerical control device 11 such as USB memory and an external hard disk drive.

The transmission control unit 5, machining processing unit 6, read control unit 7 and schedule update unit 9 are respectively realized by installing the appropriate processing programs in the CPU of the numerical control device 11. The transmission control unit 5, machining processing unit 6, read control unit 7 and schedule update unit 9 are distinguished functionally, and may not necessarily be distinguishable in the physical structure and program structure.

The program cache unit 2, schedule cache unit 4 and execution sequence storage unit 8 are respectively realized by allocating storage area in the internal memory which can be read by the CPU constituting the transmission control unit 5, machining processing unit 6, read control unit 7 and schedule update unit 9.

The program storage unit 1 and schedule storage unit 3 are respectively realized by allotting storage area in the storage device of the external device 12.

The program storage unit 1 stores the entirety of machining programs including a plurality of data blocks. The data blocks of the machining programs are unit information defining one operation of the machining device. The machining program is written in G code and M code, for example. In the plurality of data blocks, the data blocks stipulating conditional branches can be included. In addition, the machining program may be established as a configuration written separately as a main program and one or a plurality of sub programs, and calling the sub programs from the main program.

The program cache unit 2 temporarily stores part of the data blocks of the machining program. By storing data blocks necessitated by the machining processing unit 6 in the program cache unit 2 in advance, it is possible to shorten the time required in order for the machining processing unit 6 to read out the data block, and improve the execution speed of the machining program.

The schedule storage unit 3 stores the schedule information which writes the order of data blocks to send from the program storage unit 1 to the program cache unit 2. The schedule information stored in the schedule storage unit 3 can be established as contents such as those shown in FIG. 2, as an example. The schedule information of FIG. 2 is written in lines with the program number, transmission start line number and transmitting number of lines as information of one group, and a plurality of groups of information are written in the order to be transmitted. The program number can be established as the number or file name specifying the main program or sub program. It should be noted that, in the schedule information, due to being written using the transmitting number of lines, the plurality of data blocks written consecutively in the machining program may be included in one line of information. In addition, for ease of understanding, FIG. 2 illustrates text of the "program number", "transmission start line number" and "transmitting number of lines" indicating the meaning of the data; however, these lines of text may not necessarily be included in the actual schedule information.

In the present embodiment, the schedule information is the reading order of data blocks by the machining processing unit 6 during the previous machining program execution as described later, and is updated by the schedule update unit 9 every time executing the machining program. For this reason, upon executing the machining program for the first time, schedule information updated by the schedule update unit 9 does not exist. Therefore, as initial settings, the sequence inputted by an operator, or the same sequence as the written sequence of the main program of the machining program as shown in FIG. 3 may be stored as schedule information in the schedule storage unit 3 initially.

During execution start of the machining program, the schedule information stored in the schedule storage unit 3 is transmitted, and the schedule cache unit 4 temporarily stores the schedule information. Since it is thereby possible to eliminate or reduce the need for reading the schedule information from the schedule storage unit 3 having a low reading speed, during execution of the machining program, it is possible to make waiting less likely in the machining processing unit 6.

The transmission control unit 5 controls transmission of data blocks to the program cache unit 2 from the program storage unit 1 by referencing the schedule information stored in the schedule cache unit 4. More specifically, the transmission control unit 5 transmits data blocks of the machining program from the program storage unit 1 to the program cache unit 2 in the order written in the schedule information as a general rule. In addition, the transmission control unit 5, in the case of there being a request from the read control unit 7, performs interrupt processing of preferentially transmitting the data blocks requested from the read control unit 7. For this reason, even if the aforementioned such schedule information is stored in the schedule storage unit 3 as initial settings, at all such times, it is possible to perform the appropriate processing by transmitting the required data blocks of the main program or sub program from the program storage unit 1 to the program cache unit 2.

The machining processing unit 6 generates a drive command which causes the machining device 20 to appropriately operate, by reading the machining program from the program cache unit 2 and processing in order. For this reason, the machining processing unit 6 notifies the program number and line number of the required data block to the read control unit 7.

The read control unit 7 reads out the data blocks necessitated by the machining processing unit 6 from the program cache unit 2, and sends to the machining processing unit 6. For this reason, the read control unit 7 confirms whether the essential data blocks are stored in the program cache unit 2, and requests (cache request) so as to read the data blocks necessitated in the transmission control unit 5 from the program storage unit 1 into the program cache unit 2, in the case of not being stored in the program cache unit 2.

The execution sequence storage unit 8 stores the sequence of data blocks read out and executed by the machining processing unit 6. FIG. 4 illustrates the contents of the execution sequence stored by the execution sequence storage unit 8. With the data of FIG. 4, the data block written in the second line differs from the contents of the schedule information in FIG. 2. Even if performing machining of the same product based on the same machining program, there are cases where the conditions thereof change due to the wear of the tool, temperature change, etc., for example, and the sub program called by the main program differs, and the sequence of data blocks to be executed change.

The schedule update unit 9 overwrites the schedule information of the schedule storage unit 3 so as to match the read sequence of data blocks by the machining processing unit 6 stored by the execution sequence storage unit 8. The schedule update unit 9, for shortening of the waiting time in the machining processing unit 6, may be configured so as to overwrite the schedule information at a timing not overlapping with the transmission of the machining program to the program cache unit 2 from the program storage unit 1 by the transmission control unit 5.

The machining device 20 is controlled by the machining system 100, and performs machining in accordance with a drive command from the machining processing unit 6 of the numerical control device 11 directly. More specifically, the machining device 20 is a device which machines a workpiece by causing the workpiece and tool to relatively move in accordance with the instruction from the machining system 100. The specific configuration of the machining device 20 is not particularly limited, and can be established as a machining center, lathe, laser beam machine or the like, for example.

In the above way, the machining system 100 equipped with the machining control system 10, due to transmitting data blocks of machining programs stored in the program storage unit 1 by the transmission control unit 5 to the program cache unit 2 in a sequence following the schedule information stored in the schedule storage unit 3, even if conditional branches or the calling of sub programs is included in the machining program, can reduce the waiting time for reading data blocks trying to be executed by the machining processing unit 6, and improve the productivity. In addition, by such a reduction in machining time, it is possible to suppress a decline in the machining precision caused by machining being interrupted unexpectedly.

In particular, the machining control system 10 overwrites the schedule information of the schedule storage unit 3 by the schedule update unit 9, so as to make match the execution sequence of actual data blocks stored in the execution sequence storage unit 8. For this reason, the machining control system 10 can more reliably reduce the waiting time for writing the data blocks by the machining processing unit 6.

In addition, the machining control system 10, due to the program storage unit 1 and schedule storage unit 3 being provided to the external device 12, can store numerous machining programs, and easily install different machining programs. In the case of accessing the storage area of the external device 12 from the numerical control device 11, since the reading speed thereof tends to be low, by transmitting the machining program from the program storage unit 1 to the program cache unit 2, an effect of the machining control system 10 which can improve the productivity by reducing the waiting time for machining program writing of the machining processing unit 6 becomes remarkable.

Although an embodiment of a machining system and machining method according to the present disclosure has been explained above, the machining system and machining method according to the present disclosure are not limited to the aforementioned embodiment. In addition, the effects described in the present embodiment are merely listing the most preferred effects produced from the present disclosure, and the effects from the machining system and machining method according to the present disclosure are not limited to those described in the present disclosure.

The aforementioned embodiment explains a form in which the program storage unit and schedule storage unit are provided to an external device; however, in the machining control system according to the present disclosure, the program storage unit and schedule storage unit may be provided within the numerical control device. As an example, in the case of the program storage unit and schedule storage unit being stored in a comparatively slow storage device such as a disk storage device of the numerical control device, it is possible to improve the productivity by shortening the waiting time of the machining processing unit, by storing the data blocks temporarily in the program cache unit in accordance with the schedule information. In addition, only one of the program storage unit and schedule storage unit may be provided to the external device, and the other one may be provided within the numerical control device.

In the machining control system according to the present disclosure, the schedule cache unit, execution sequence storage unit and schedule update unit may be omitted.

In the aforementioned embodiment, the transmission control unit and read control unit are explained as independent constituent elements; however, the transmission control unit may include the functions of the read control unit. In other words, in the machining control system according to the present disclosure, the transmission control unit may be configured so as to perform determination of interrupting the transmission of data blocks necessitated according to the processing of the machining processing unit, in the sequence written in the schedule information.

EXPLANATION OF REFERENCE NUMERALS

1 program storage unit
2 program cache unit
3 schedule storage unit
4 schedule cache unit
5 transmission control unit
6 machining processing unit
7 read control unit
8 execution sequence storage unit
9 schedule update unit
10 machining control system
11 numerical control device
12 external device
20 machining device
100 machining system

What is claimed is:
1. A machining control system comprising:
a first memory;
a second memory; and
a CPU, wherein
the first memory is configured to store a machining program including a plurality of data blocks,
the CPU is configured to temporarily store parts of the machining program including respective separate portions of the plurality of data blocks in the second memory,
the first memory is further configured to store schedule information specifying a transmission sequence for transmitting the respective separate portions of the plurality of data blocks to the second memory, and
the CPU is further configured to:
individually control transmission of the respective separate portions of the plurality of data blocks to the second memory from the first memory, based on the transmission sequence specified in the schedule information, and individually read out the respective separate portions of the plurality of data blocks from the second memory and perform processing required in machining.

2. The machining control system according to claim 1, wherein the CPU is further configured to:

store a sequence of the individually read out respective separate portions of the plurality of data blocks in the second memory, and overwrite the schedule information stored in the first memory so as to match the sequence stored in the second memory.

3. The machining control system according to claim 1, wherein the CPU is further configured to:

read and temporarily store the schedule information from the first memory to the second memory, and the individually controlled transmission of the respective separate portions of the plurality of data blocks is performed by alternatively referencing the schedule information stored in the second memory.

4. The machining control system according to claim 1, wherein the second memory and the CPU are provided on a numerical control device of a machining device, and wherein the first memory is provided on an external device which is connected to the numerical control device.

5. A machining system comprising:

the machining control system according to claim 1; and a machining device which is controlled by the CPU.

* * * * *